Patented Sept. 21, 1948

2,449,815

UNITED STATES PATENT OFFICE 2,449,815

RESOLUTION OF AZEOTROPIC MIXTURES OF CHLOROSILANES

Arthur E. Newkirk, Schenectady, N. Y., assignor to General Electric Company, a corporation of New York No Drawing. Application May 23, 1946, Serial No. 671,913

3 Claims. (Cl. 260—448.2)

The present invention relates to a method of resolving mixtures of tetrachlorosilane (silicon tetrachloride) and trimethylchlorosilane which comprises converting the trimethyl chlorosilane to trimethylfluorosilane and isolating the trimethylfluorosilane. More particularly, the invention is concerned with a method of resolving azeotropic or constant boiling mixtures of these two chlorosilanes which comprises reacting such mixtures with zinc fluoride, and separating the resultant trimethylfluorosilane from the tetrachlorosilane by distillation.

In the preparation of methylchlorosilanes by effecting reaction between silicon and methyl chloride in accordance with the processes described and claimed in Patent No. 2,380,995 to Rochow, and Patent No. 2,380,996 to Rochow and Patnode, assigned to the same assignee as the present invention, the reaction products comprise a mixture of chlorosilanes including various methyl chlorosilanes and tetrachlorosilane.

It has been found that these chlorosilane mixtures cannot be completely separated into their various components by fractional distillation because the trimethylchlorosilane and tetrachlorosilane components not only have approximately the same boiling points (about 57.5° C.) but also form a constant boiling mixture of about 35.2 per cent by weight of trimethylchlorosilane and 64.8 per cent by weight of tetrachlorosilane distilling at a temperature of about 54.5° C. As the trimethyl compound and its derivatives are particularly useful for many commercial applications where the presence of tetrachlorosilane cannot be tolerated, it was highly desirable that some means be found for resolving this azeotrope without subjecting the compounds to hydrolyzing or resinifying conditions.

Various standard methods are known for resolving an azeotrope. One of the most common methods is to fractionate the azeotrope at pressures other than atmospheric pressure. With this method no appreciable change in the composition of the tetrachlorosilane-trimethylchlorosilane azeotrope is effected at practical super- or sub-atmospheric pressures. Another method involves the solvent extraction of one or more of the components. This method has not been found applicable to the tetrachlorosilane-trimethylchlorosilane azeotrope due to the extreme reactivity of its components and the slight structural and solubility differences between them.

Other methods, which have been employed specifically in resolving the subject azeotropic mixtures are those described and claimed in Patent No. 2,381,139 to Robert O. Sauer, and Patent No. 2,388,575 to Robert O. Sauer and Charles E. Reed, both patents being assigned to the same assignee as the present invention. Patent No. 2,381,139 discloses a method of resolving the subject azeotropic mixture which comprises reacting the two chlorosilanes with ethylene oxide to form the corresponding chloroethoxy derivatives and thereafter separating the resultant chloroethoxysilanes by fractional distillation. The separate chloroethoxysilanes may be converted to the original chlorosilanes by treatment with an organic acid chloride such as benzoylchloride. Patent No. 2,388,575 describes the addition of acetonitrile or acrylonitrile to the subject azeotrope in quantities slightly in excess of that necessary to form a tetrachlorosilane-nitrile azeotrope which boils at a temperature below the boiling point of trimethylchlorosilane. The tetrachlorosilane-nitrile azeotrope is then distilled off first, followed by the principal fraction consisting of trimethylchlorosilane.

In accordance with the process of the present invention, the trimethylchlorosilane in the subject azeotropic mixture is converted to trimethylfluorosilane by treating the azeotrope with zinc fluoride and isolating the trimethylfluorosilane, more particularly by separating the resultant trimethylfluorosilane from the mixture by distillation. Pearlson, Brice, and Simons (J. A. C. S., vol. 67, pp. 1769–1770) have described the conversion of mixtures of methylchlorosilanes and tetrachlorosilane to the corresponding methylfluorosilanes and tetrafluorosilane by reacting such mixtures with hydrogen fluoride. I have found that, in employing zinc fluoride in accordance with the method of my invention, the zinc fluoride reacts preferentially with the trimethylchlorosilane in the azeotrope rather than the tetrachlorosilane to produce trimethylfluorosilane, which is then readily separated from the unconverted tetrachlorosilane. This preferential reaction of the zinc fluoride with the trimethylchlorosilane, leaving the tetrachlorosilane unconverted, affords definite advantages, in that only sufficient zinc fluoride to convert the trimethylchlorosilane need be added to the azeotropic mixture, and furthermore, the unconverted tetrachlorosilane, which may be recovered directly from the reaction mass by distillation, in a high degree of purity, is a useful by-product more readily handled than the very low boiling (−95° C.) tetrafluorosilane.

Part of the trimethylchlorosilane is not converted during the reaction with zinc fluoride and remains in the reaction mass in the form of a small quantity of azeotrope with the unconverted tetrachlorosilane. In order to further improve the yields obtainable by the method of this invention, this unconverted portion of the azeotropic mixture may be further treated with zinc fluoride after removal of the trimethylfluorosilane and unconverted tetrachlorosilane from the initial reaction mass.

In order that those skilled in the art better may understand how the present invention may be carried into effect, the following illustrative example is given.

Ninety-three and two-tenths gms. of zinc fluoride which had been dried at 110° C. for 90 hours was added with vigorous stirring to 559 grams of an azeotropic mixture of trimethylchlorosilane and tetrachlorosilane in a three-necked flask. The zinc fluoride employed was approximately chemically equivalent to the trimethylchlorosilane present in the azeotrope. That is, the mol. ratio of zinc fluoride to trimethylchlorosilane was approximately 1 to 2. A rapid evolution of gas occurred at the beginning of the reaction. This gas passed through a reflux condenser inserted in one of the necks of the flask to a trap cooled by a mixture of dry ice and acetone. Some of the gas was condensed and returned to the flask by the reflux condenser. After the initial rapid evolution of gas, heating of the flask was continued until all of the liquid in the flask had been distilled through the condenser into the trap. The mixture in the trap was then transferred to a distillation apparatus and fractionated at prevailing atmospheric pressure (about 753 mms.). The low-boiling trimethylfluorosilane distilled over at about 17° C. followed by a fraction of unreacted azeotrope, and last, a fraction consisting of tetrachlorosilane. The weights of the various fractions obtained were: 91.7 gms. trimethylfluorosilane, 117.8 gms. tetrachlorosilane, and 192.5 gms. unreacted azeotrope.

In the above illustration, approximately 35 per cent of the original azeotrope remained unresolved. As pointed out previously in this specification, this portion of the azeotrope could be further reacted with zinc fluoride, followed by fractional distillation, in order to improve the over-all efficiency of my method.

The trimethylfluorosilane may be readily hydrolyzed with sodium hydroxide solution to form hexamethyldisiloxane, a commercially desirable product.

It will be understood, of course, by those skilled in the art that mixtures containing methylchlorosilanes other than trimethylchlorosilane, e. g., dimethyldichlorosilane and methyltrichlorosilane, may be converted to the corresponding fluorosilanes by treating such silanes or mixtures containing the same with zinc fluoride. For instance, trimethylfluorosilane, dimethyldifluorosilane, and methyltrifluorosilane were prepared by adding the corresponding chlorosilane to zinc fluoride in a three-necked flask in approximately chemically equivalent amounts. The zinc fluoride had previously been dried at 110° C. for approximately 24 hours and cooled to approximately 30° C. The gas that was evolved in each case was passed through a water-cooled reflux condenser to a trap cooled by a mixture of dry ice and acetone. The reflux condenser returned the part of the unreacted chlorosilane to the flask. When the chlorosilane was first added to the zinc fluoride in the flask, a rapid evolution of gas occurred. After this initial rapid evolution of gas, the flask was heated until the reaction ceased. The contents of the trap were then distilled through a fractionating column to obtain the fluorosilane. During this fractionation, some hydrogen chloride distilled off first at −85° C., followed by the fluorosilane, and then the unreacted chlorosilane. The boiling points of the various fluorosilanes at approximately 760 mm. pressure were found to be as follows: Trimethylfluorosilane, 17° C.; dimethyldifluorosilane, 3° C.; methyltrifluorosilane, −30° C.

What I claim as new and desire to secure by Letters Patent of the United States is:

1. The method of resolving an azeotropic mixture of trimethylchlorosilane and tetrachlorosilane which comprises treating said mixture with zinc fluoride to convert the trimethylchlorosilane to trimethylfluorosilane, and separating trimethylfluorosilane from the treated mixture by distillation.

2. The method of resolving an azeotropic mixture of trimethylchlorosilane and tetrachlorosilane which comprises reacting zinc fluoride with said mixture to convert a portion of the trimethylchlorosilane to trimethylfluorosilane, and separating the trimethylfluorosilane and tetrachlorosilane from the unreacted azeotrope by distillation.

3. The method of resolving an azeotropic mixture of trimethylchlorosilane and tetrachlorosilane comprising reacting with said mixture zinc fluoride in an amount approximately chemically equivalent to the trimethylchlorosilane present in said mixture, and separating the resultant trimethylfluorosilane by fractional distillation.

ARTHUR E. NEWKIRK.

REFERENCES CITED

The following references are of record in the file of this patent:

UNITED STATES PATENTS

| Number | Name | Date |
|---|---|---|
| 2,381,139 | Sauer | Aug. 7, 1945 |
| 2,388,575 | Reed | Nov. 6, 1945 |

OTHER REFERENCES

Pearlson et al., "Journal Amer. Chem. Society," vol. 67 (1945), pages 1769–1770.

Emeleus et al., "Journal Chemical Society" (London), 1944, pages 454–456.

Rochow, "Chemistry of the Silicones" (1946), p. 93, Wiley & Sons, publishers.